United States Patent [19]

Tyree, Jr.

[11] 3,952,530
[45] Apr. 27, 1976

[54] $CO_2$-SNOW-MAKING

[76] Inventor: Lewis Tyree, Jr., 10401 S. Oakley Ave., Chicago, Ill. 60643

[22] Filed: Aug. 20, 1974

[21] Appl. No.: 499,035

[52] U.S. Cl. .......................................... 62/10; 62/35
[51] Int. Cl.² .......................................... F25J 1/00
[58] Field of Search ....................... 62/10, 12, 35, 8

[56] References Cited
UNITED STATES PATENTS

| | | | |
|---|---|---|---|
| 3,070,967 | 1/1963 | Uren ....................................... | 62/35 |
| 3,443,389 | 5/1969 | Townsend et al ...................... | 62/35 |
| 3,681,930 | 8/1972 | Tyree ..................................... | 62/35 |

*Primary Examiner*—Norman Yudkoff
*Assistant Examiner*—Frank Sever
*Attorney, Agent, or Firm*—Fitch, Even, Tabin & Luedeka

[57] ABSTRACT

A method of controlling a $CO_2$ snow-making operation which is promptly self-correcting should an upset occur that results in incomplete separation of $CO_2$ snow from the cold $CO_2$ vapor. The separated snow is fed to a generally closed chamber, while a major portion of the cold $CO_2$ vapor is passed in heat-exchange relationship with warmer liquid $CO_2$ flowing toward the expansion nozzle. The temperature and/or pressure of the $CO_2$ vapor exiting the heat-exchanger is monitored, and upon detecting a condition indicative of incomplete separation of snow from vapor, the flow of vapor through the heat-exchanger is temporarily reduced while flow of a minor portion of $CO_2$ vapor is permitted to exit from the generally closed chamber. Prompt correction of the situation causing the incomplete separation automatically results.

13 Claims, 2 Drawing Figures

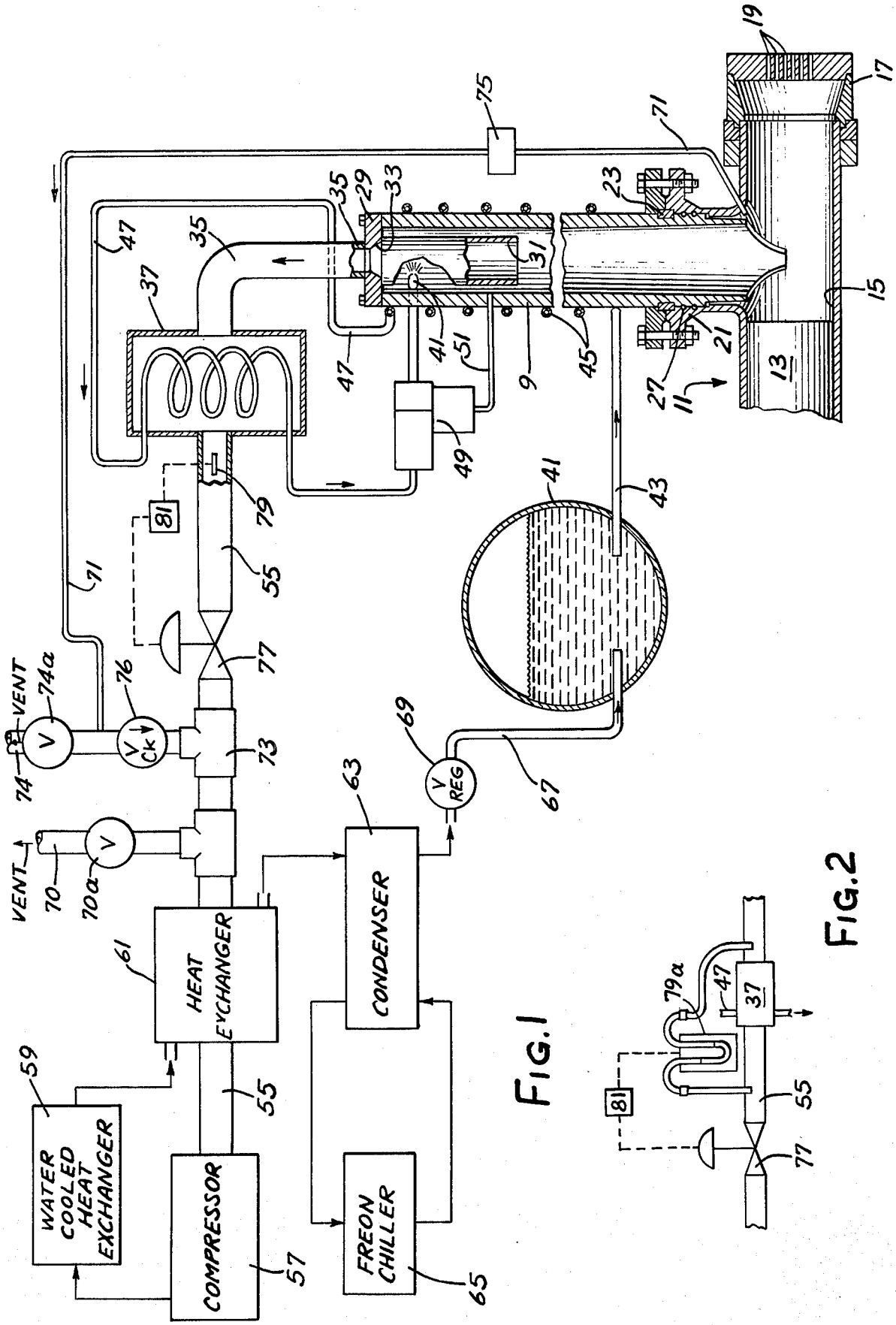

CO₂-SNOW-MAKING

This invention relates to $CO_2$ snow-making systems and more particularly to control arrangements for $CO_2$ snow-making and vapor separation systems.

In order to produce solid $CO_2$, which is some times termed "dry ice", high pressure $CO_2$ is usually expanded to produce a mixture of $CO_2$ snow and $CO_2$ vapor, and the bulky $CO_2$ snow is then compressed, often employing a reciprocating ram, to form a dense, solid product. This general concept has been employed for many years in block dry ice presses and more recently has been employed to extrude smaller nuggets or pellets of dry ice by pressing densely compacted snow through openings in an extrusion die, as shown for example, in U.S. Pat. No. 3,681,930 which issued on Aug. 8, 1972 to Lewis Tyree, Jr. A snow compression device of this general type can be thought of as having two separate but intimately interrelated functions: (1) the expansion of the liquid to snow and vapor, followed by the separation of the snow from the vapor, and (2) the ultimate compression of the snow into a dense, solid product, usually in a generally closed chamber wherein a reciprocating ram operates.

As an example of function (1), in the apparatus illustrated in the above-referenced U.S. patent, the high pressure liquid $CO_2$ is expanded through a nozzle into the upper portion of a column or tower. The flow of snow and vapor from the expansion nozzle is tangentially into the column, and separation of snow and vapor is effected in the manner of a cyclone separator. The pressure within the column is maintained at a value below the triple point pressure (about 75 p.s.i.a.) of carbon dioxide. By lowering the temperature of the liquid $CO_2$ being expanded, a mixture of approximately 50 percent $CO_2$ snow and 50 percent $CO_2$ vapor (by weight) may be obtained, and the ready refrigeration capacity of the cold $CO_2$ vapor is usually employed for this purpose. The denser snow travels around the inner wall of the column accumulating at the bottom thereof and falling intermittently into the compression chamber of the reciprocating ram. Meanwhile, the vapor is directed to the central portion of the column from which it exits upward through a hollow cylindrical baffle. The lower portion of the tower tapers outward and downward to assure the quick dropping of the snow into the intermittently opening compression chamber.

In any snow-making and separating system, upsets will occur that will result in incomplete separation of snow and vapor. For example, the presence of a large vapor bubble in the liquid $CO_2$ supply line may interrupt the centrifugal flow pattern in the column and result in the carry-over of snow with the exiting vapor. Moreover, although there are built-in design features to guard against the hang-up of the accumulated snow at the bottom of the column (instead of falling readily into the opening compression chamber), it is occasionally possible for such a hang-up to occur which disrupts the operating conditions of the snow-making column. One of the results of such an upset is an increase in pressure in the column and the carry-over of snow with the exiting vapor. The carry-over of snow begins to gradually clog lines and valves in the vapor removal system which usually results in some interference with the pressure which is desirably maintained in the column. Because the operation of the snow expansion nozzle is usually maintained responsive to the pressure measured in the column, such upsets result in unstable snow-making operation and often in the ultimate interruption in the operation which requires shutdown for a substantial period of time to clear the clogged valves and/or lines.

It is the object of the present invention to provide an improved control system for a $CO_2$ snow-making and separation system which is designed to minimize interruption in operation. Another object is to provide a method of control for a $CO_2$ snow-making and separating system which is automatically self-regulating. A further object is to provide a system for making $CO_2$ snow, separating the $CO_2$ snow from the accompanying vapor and compressing the separated snow to dense, solid $CO_2$ in a generally closed chamber which system is designed to detect undesirable deviations in the operation of the snow-making and separating and promptly restore normal operating conditions.

These and other objects of the invention will become clear from the following detailed description of a system embodying various features of the invention, particularly when reading in conjunction with the accompanying drawings wherein: FIG. 1 shows such an illustrative system, and FIG. 2 shows an alternative embodiment of a part of such system.

As indicated in respect of the aforementioned U.S. patent, it is common to employ a heat-exchanger wherein the cold $CO_2$ vapor exiting from the snow-making device is employed to sub-cool the high pressure liquid $CO_2$ being fed to the expansion nozzle. Such a vapor-liquid heat-exchanger will employ an extended surface, e.g., fins, on the vapor side. When an upset in the operating conditions of the snow-making device occurs and snow is carried over with $CO_2$ vapor into the vapor removal system, the presence of the snow in the heat-exchanger is reflected in two ways. A decrease in the temperature of the cold vapor occurs because the sublimation of the snow in the heat-exchanger absorbs the heat flowing to the vapor from the liquid $CO_2$ being subcooled, which heat would otherwise cause a rise in the temperature of the $CO_2$ vapor exiting the heatexchanger. A decrease in the downstream pressure of the $CO_2$ vapor also occurs which is a result of the gradual clogging by snow build-up on the extended surface of the heat-exchanger and/or lines and valves.

It has been found that, by monitoring $CO_2$ vapor conditions downstream of or across the heat-exchanger, e.g., by measuring temperature and/or pressure, early detection of the occurrence of such an upset and immediate counteraction can be automatically achieved. An auxiliary vapor removal conduit is provided which extends from a location in the generally closed compression chamber, and an adjustable valve is preferably provided in the main $CO_2$ vapor removal line at a location downstream of the heat-exchanger. This adjustable valve is controlled automatically by sensor which monitors either the temperature or pressure of the $CO_2$ vapor. As soon as a change in either temperature or pressure is detected, which is reflective of an upset in the column causing snow to be carried over with the vapor, the opening through the adjustable valve is reduced. Reduction in the valve opening causes the back pressure at the upper exit from the snow column to rise and increases the tendency of the $CO_2$ vapor to exit the column via the auxiliary conduit leading from the compression chamber.

When column pressure is being used to control the snow nozzle, the rise in back pressure results in decreasing the rate of expansion of liquid $CO_2$, and this provides the opportunity for the centrifugal circulation pattern to be reestablished in the column if this was the cause of the upset. An increase in flow of $CO_2$ vapor downward into the compression chamber and out through the auxiliary conduit also occurs which has the effect of forcing any accumulated snow hang-up downward into the compression chamber when the ram retracts and thus quickly clearing any snow blockage that might have occurred at the bottom of the column. If it was such a snow hang-up which caused the upset rather than some other disruption of the separation pattern, once the blockage is removed, normal separation conditions are promptly re-established. Thereafter, as the temperature and/or pressure that is being sensed rises, the adjustable valve opening is again increased until the design operating conditions are automatically re-established.

Illustrated in the drawings is a snow tower or column 9 which surmounts an extrusion device 11 designed to form dense $CO_2$ nuggets or pellets; however, the invention is considered to be useful for controlling other systems where snow is created by the expansion of liquid $CO_2$, and the snow is then separated from the accompanying vapor and fed to a generally closed chamber or the like.

A ram 13 reciprocates in a generally closed cylindrical chamber 15 which is provided at its right-hand end with a die 17 having a plurality of apertures 19 through which parallel rods of dense dry ice are extruded. These rods break into short pellets or nuggets after their emergence from the die 17. The ram 13 is driven in reciprocating movement by a suitable hydraulic pump and a double-acting hydraulic cylinder (not shown).

The snow column section includes the generally tubular column 9 which is designed to fit downward into a collar support section 21 that is suitably affixed, as by welding, to the underlying extruder 11 and provides an opening into the upper portion of the extrusion chamber 15. A peripheral recess in the exterior surface of the column 9 accommodates a split ring 23, and the column 9 is held rigidly in place surmounted atop the extruder 11 by a clamping ring 25 which is suitably bolted in place over the split ring 23. Suitable seals 27 are provided between the exterior surface of the column 9 and the interior wall of the collar support section 21 to prevent the escape of vapor at this location.

The upper end of the column is partially closed by a cap plate 29 which carries a depending tube or hollow baffle 31 which extends downward from a central exit aperture 33 in the cap plate. A first vapor removal conduit 35 is connected to the apertured cap plate and leads from the top of the column 9 to the main heat-exchanger 37. A nozzle 41 which is associated with an adjustable expansion device extends tangentially into the column 9 at a location between the inner wall thereof and the tubular baffle 31. The snow and vapor which is created by the expansion of the high pressure liquid $CO_2$ leaves the nozzle and, because of its disposition, quickly establishes a downward spiral circulation pattern, traveling adjacent the inner wall of the column. This circulation pattern creates a centrifugal separation effect, like that experienced in a cyclone separator, causing the solid snow to tend to travel along the column wall while the $CO_2$ vapor remains primarily in the central region. The vapor is provided with a ready exit through the center of the tubular baffle 31 and upward into the first leg 35 of the vapor removal system.

In the overall operation of the illustrated extrusion apparatus 11, a liquid carbon dioxide storage vessel 41 is provided wherein the liquid $CO_2$ is generally maintained at a pressure of between 220 and 300 p.s.i.g., usually in the neighborhood of about 285 p.s.i.g. Liquid $CO_2$ from the tank is fed through a supply line 43 to the snow column 9, and if there is a considerable distance between the storage vessel 41 and the snow column 9, a pump may be included.

In order to subcool the high pressure liquid $CO_2$, which may be at a temperature of about 0° F. in the storage tank, and more importantly to warm the wall of the column to minimize the adherence of $CO_2$ snow to the interior surface thereof, a spiral coil of tubing 45 of aluminum or the like, which is in heat-exchange contact with the outer surface of the column 45 is provided through which the high pressure liquid $CO_2$ is first passed. The slightly subcooled liquid exiting from the coil 45 is then directed through a line 47 leading to the main heat-exchanger 37. Substantial subcooling of the liquid $CO_2$ is effected herein utilizing the available refrigeration capacity of the cold vapor exiting from the upper end of the tower through the conduit 35.

After this additional subcooling, the high pressure liquid is supplied to the variable expansion nozzle 41 where the creation of the snow-vapor mixture occurs near the top of the snow tower. The control of the liquid expansion in the illustrated system is accomplished by an associated controller 49 which utilizes a pilot line 51 that reads the pressure within the column 9. The system is designed to maintain a desired pressure within the column 9 above about 5 p.s.i.g. and below 60 p.s.i.g., and usually between about 25 and 40 p.s.i.g. When the pressure being read via the pilot line 51 rises above the set pressure, the controller 49 causes the variable expansion device 41 to slow the rate of expansion of the liquid $CO_2$ until the pressure falls to the desired level. Similarly, when the pressure falls below the desired level, the rate of expansion is increased. Of course, instead of controlling the rate of expansion of liquid $CO_2$ on the basis of the pressure in the column, temperature control can similarly be used by substituting a thermocouple or the like for the pilot line 51.

The still cold $CO_2$ vapor exits from the main heat-exchanger 37 through the conduit 55 which forms the second leg of the vapor removal system and leads eventually to a compressor 57. The compressor 57 raises the pressure of the vapor to slightly above 300 p.s.i.g., whereby the vapor picks up a considerable amount of heat. The high pressure vapor is generally first fed through a water-cooled heat-exchanger 59 and then to a heat-exchanger 61 which is interconnected within the conduit 55 between the main heatexchanger 37 and the compressor 57 so that an exchange of heat with the cold vapor flowing toward the compressor is carried out, to remove still more of the sensible heat of the high pressure vapor.

The high pressure vapor exiting from the heat-exchanger 61 is supplied to a condenser 63 which is usually cooled by a refrigeration unit 65 using a Freon refrigerant. The condensed vapor is then returned through a return line 67 to the $CO_2$ storage vessel, and a pressure-regulating valve 69 may be included in the return line to maintain a minimum of pressure, for example, above 300 p.s.i.g., so that more efficient functioning of the Freon refrigeration unit is achieved.

In a commercial operation of this type, it is considered most economically practicable to size and control the overall system based upon the capacity of the compressor. It should be understood, however, that the invention is considered applicable whether or not the $CO_4$ vapor is recovered by the specific arrangement illustrated, by some other recovery arrangement, or at all; and a vent line 70 and an associated manual control valve 70a are preferably incorporated into the system so as to be available should the compressor 57 become disabled at a time when it is desired to continue making snow. From a strictly economic standpoint, vapor recovery and reliquefication will usually be effected. The compressor motor is preferably run at constant speed during operation, and the remaining components of the system are arranged to provide a constant supply of $CO_2$ vapor to the suction or intake of the compressor 57. The amount of vapor available is of course dependent upon the rate at which high pressure liquid $CO_2$ is expanded in the column, and this rate is controlled by the operation of the variable expansion device 41. As indicated hereinbefore, the rate of expansion is controlled by providing the pilot line 51 which reads the pressure within the snow tower and regulates the expansion device accordingly. Another alternative method of controlling the variable orifice expansion device is to monitor the inlet pressure at the condenser 63.

If a partial or temporary hang-up of snow at the bottom of the snow column 9 were to occur, it would be reflected by a slight rise in the pressure in the snow tower, and snow would begin to be carried over with the exiting vapor out the upper exit 33 and into the conduit 35 which forms the first leg of the vapor removal system. If the only control incorporated into the system were that of the liquid expansion device 41, the increase in pressure sensed by the pilot line 51 would eventually result in slowing the rate of liquid expansion; however, this effect would not itself tend to clear a hang-up or blockage at the bottom of the snow column. Moreover, should the blockage ultimately fall of its own weight, it might well be too late to avoid the plugging of the heat-exchanger 37 by the snow that was carried over during the interim period.

In the illustrated embodiment, an auxiliary path is provided for the cold vapor to leave the column 9 via the extrusion chamber 15. A conduit 71 is connected into the generally closed extrusion chamber 15 at a location just outward the base of the collar support section 21, and the conduit 71 leads to the second leg of the vapor removal system, connecting to the conduit 55 at a tee 73 just upstream of the heat-exchanger 61. A branch vent line 74 and an associated manual control valve 74a are provided in the line 71. A flow-control or pressure-regulating device 75, such as one that facilitates substitution of orifices of different sizes may be provided in the conduit 71, or alternatively, the relative size of the lines 35 and 71 may be relied upon. The arrangement is preferably such that, under normal operation, about 90 percent of the $CO_2$ vapor created is returned to the compressor 57 through the main vapor removal conduit 35 and the remaining about 10 percent flows through the auxiliary conduit 71. A check valve 76 may be provided in the line 71 to eliminate any possibility of back flow from the main vapor removal conduit 55.

An adjustable control valve 77 is provided in the conduit 55 at a location downstream of the main heat-exchanger 37 and upstream of the tee 73, which is usually located just upstream of the high pressure vapor heat-exchanger 61. A sensor 79 is provided for monitoring the condition of the cold vapor exiting from the snow column, and this sensor is usually provided adjacent the exit from the main heat-exchanger 37. The sensor 79 may be used to measure the temperature and/or pressure of the cold vapor, and as indicated hereinbefore, it is used for the purpose of immediately detecting the carryover of snow with the vapor from the snow column. In the illustrated embodiment, and for purposes of the following explanation, it is understood that a temperature sensor 79 is employed; however, as indicated, either or both could be used. For example, a differential pressure measuring devide 79a could be employed, as depicted in FIG. 2, which would compare the pressure at the inlet and at the outlet of the main heat-exchanger 37 to thereby determine the pressure drop across the heat-exchanger which will begin to increase significantly as soon as snow begins to build up on the extended surface of the vapor side of the heat-exchanger. When snow is carried over with the vapor, the snow sublimes within the main heat-exchanger 37, and thus the temperature at the outlet will begin to approach that of the column, which is an immediate indication that an upset of some sort has occurred in the operation of the column 9.

In any respect, when the signal from the sensor 79, which is transmitted to a controller 81 that is appropriately set for normal operating conditions, indicates that snow is being carried out of the column, the controller 81 causes the adjustable valve 77 to decrease the size of the opening therethrough. This temporary decrease in the size of the valve opening has two effects: the pressure increases within the snow column, and a tendency is immediately created for a greater percentage of $CO_2$ vapor to leave the column 9 via the auxiliary conduit 71. The increase in pressure within the column, coupled with the shift in vapor flow which will increase the volume percentage of vapor being removed from the column via the extrusion chamber 15, creates forces which effectively overcome any bridging of the snow which might be creating a hang-up at the entrance to the extrusion chamber. As a result, any temporary blockage of snow which might have occurred is discharged downward into the chamber to obviate the condition which caused the upset to initially occur.

Should the carry-over of snow have resulted from a disruption in the spiral circulation pattern within the column 9, as for example might occur as a result of a large bubble of vapor in the liquid supply line temporarily interrupting the creation of snow, the upset is also promptly corrected by the responsive action of the control system. When the controller 81 closes down the opening through the adjustable valve 77, the back pressure which is created is instantly reflected within the column 9 itself and is thus sensed through the pilot line 51. The sensing of the increased pressure in the column causes the controller 49 to slow the rate of flow of liquid $CO_2$ to the expansion nozzle 41. By quickly reducing the rate at which snow is being created at the top of the column 9, the spiral circulation flow pattern is quickly able to re-establish itself and begin to again effect the efficient separation of snow and vapor for which it is designed. Accordingly, whether the upset is caused by a hang-up of snow at the bottom of the column or a disruption in the separation at the top of the column, it is effectively and promptly remedied by the illustrated system.

Moreover, the reduction in the volume percent of vapor withdrawn through the main vapor removal conduit 35 increases the duration of residence of the cold vapor in contact with the warmer surfaces within the main heatexchanger 37. As a result, the temperature of the $CO_2$ vapor in the heat-exchanger 37 and the associated conduit system will rise and will effect a concomitant sublimation of any snow which may have built up on the extended surface of the heat-exchanger 37 and/or in the associated lines and valves that would have a clogging tendency. Thus, it can be seen that, through the provision of the sensor 79, the auxiliary conduit 71 and the adjustable control valve 77, an automatically self-correcting system is provided which is immediately responsive to counteract the occurrence of an upset that would likely otherwise eventually result in shutdown of the snow-making and separation apparatus for a significant period of time to unclog the vapor removal system.

In addition to beginning the self-correction to counteract an upset, the arrangement also monitors the conditions after the corrective steps have been set into motion. As the sensor 79 detects a gradual rise in vapor temperature, which is indicative of the return to desired normalcy, the controller 81 causes the opening through the adjustable valve 77 to gradually increase until the design operation condition is again achieved. At this time, the balance within the vapor removal system returns to that indicated hereinbefore, namely, about 90 percent through the main conduit 35 and about 10 percent through the auxiliary conduit.

A simple, yet effective, solution is provided which renders a snow-making and separation system, such as that illustrated with respect to a nugget extruder 11, self-regulating and automatically self-correcting with respect to counteracting the type of upset likely to occur. Although the invention has been described with regard to a preferred embodiment, it should be understood that various modifications which would be obvious to one having skill in this art are intended to be included within the scope of the invention, which is defined solely by the appended claims. For example, in addition to regulating the opening through the valve 77, a variable flow regulator 75 could be provided in the auxiliary line 71 which could be opened and closed by the controller 81. Although the invention is illustrated with respect to a system wherein the snow falls by gravity to the generally closed chamber, it is also applicable where the transfer is otherwise, for example, by centrifugal force.

Moreover, although it is preferred to monitor the condition of the cold vapor as it leaves the heat-exchanger 37 because, as hereinbefore mentioned, it is common to use such a heat-exchanger, some other heat source could be used which would continuously warm the vapor. For example, the desired control function could be achieved by providing an electric heater in the main vapor conduit which would achieve a continuous slight warming so that changes could be detected, and such a heater could also be provided with extended surface area.

Various features of the invention are set forth in the claims which follow.

What is claimed is:

1. In a method of controlling a $CO_2$ snow-making operation, which method includes
    expanding liquid $CO_2$ through a nozzle to create a mixture of $CO_2$ snow and cold $CO_2$ vapor,
    centrifugally separating said snow and vapor and feeding said snow to a generally closed chamber, and removing a major portion of said cold $CO_2$ vapor through first conduit means during normal operation,
    the improvement comprises continuously warming said cold $CO_2$ vapor flowing through said first conduit means, measuring a thermodynamic variable characteristic of said $CO_2$ vapor, selected from the group consisting of temperature and pressure, subsequent to said warming step to detect a change in said variable, and
    decreasing the rate of flow of said $CO_2$ vapor in said first conduit means responsive to said change in said variable and
    controlling flow of $CO_2$ vapor from the generally closed chamber at a greater rate than that characteristic of normal operation
    whereby temporary reduction of the rate of flow of said $CO_2$ vapor through said first conduit means resultant from said decrease, upon detecting change in said variable indicative of incomplete separation of snow from vapor due to an upset in said method results in prompt correction of the said upset.

2. A method in accordance with claim 1 wherein said major portion of said cold $CO_2$ vapor is warmed by passing in heat-exchange relationship with the warmer liquid $CO_2$ prior to the expansion thereof.

3. A method in accordance with claim 2 wherein subsequent to said heat-exchanger step said $CO_2$ vapor is compressed preparatory to reliquefying.

4. A method in accordance with claim 3 wherein a minor portion of said created $CO_2$ vapor continuously flows from the closed chamber to said compressing step without passage through said heat-exchange step.

5. A method in accordance with claim 1 wherein said vapor pressure at said separating step is normally maintained between about 25 and about 40 p.s.i.g.

6. A method in accordance with claim 1 wherein the rate at which said liquid $CO_2$ is expanded is decreased upon said detection of a change in said variable.

7. A method in accordance with claim 1 wherein said feeding of said snow to the generally closed chamber is by gravity.

8. A method in accordance with claim 7 wherein said snow is intermittently removed from the generally closed chamber by a reciprocating ram.

9. A method in accordance with claim 1 wherein, following detection of a said change in said variable and reduction of flow rate in said first conduit means, said measuring is continued and upon detection of a rise in said variable the rate of flow of said vapor through said first conduit means is increased.

10. A method in accordance with claim 1 wherein a minor portion of said created $CO_2$ vapor is continuously removed from the closed chamber and this amount of vapor is increased upon said detection of a decrease in said measured variable by partially closing a valve in said first conduit means.

11. A method in accordance with claim 10 wherein said vapor removed from said closed chamber and said separated vapor flowing through said first conduit means is combined to a single stream, compressed and reliquefied.

12. A method in accordance with claim 1, wherein said variable measured is temperature.

13. A method in accordance with claim 1, wherein said variable measured is pressure.

* * * * *